United States Patent
Kai et al.

(10) Patent No.: US 7,279,437 B2
(45) Date of Patent: Oct. 9, 2007

(54) RATED FIRE DOOR CORE AND METHOD OF MAKING

(76) Inventors: Richard H Kai, 3181 S. Emerson St., Englewood, CO (US) 80113; Kenneth A. Majors, 3126 Zenobia St., Denver, CO (US) 80212

( * ) Notice: Subject to any disclaimer, the term of this patent is extended or adjusted under 35 U.S.C. 154(b) by 237 days.

(21) Appl. No.: 11/002,779

(22) Filed: Dec. 2, 2004

(65) Prior Publication Data

US 2006/0121808 A1 Jun. 8, 2006

(51) Int. Cl.
*B32B 5/02* (2006.01)
*B32B 17/02* (2006.01)
*B32B 7/02* (2006.01)
*D03D 15/00* (2006.01)

(52) U.S. Cl. .................. 442/136; 442/181; 442/219; 428/218; 428/219; 428/220

(58) Field of Classification Search ............. 442/136, 442/181, 219; 428/218–220
See application file for complete search history.

(56) References Cited

U.S. PATENT DOCUMENTS 6,844,275 B2 * 1/2005 Yamamoto et al. .......... 442/136
2002/0124904 A1 * 9/2002 Howland et al. ........ 139/420 R

* cited by examiner

*Primary Examiner*—Lynda Salvatore
(74) *Attorney, Agent, or Firm*—Barber Legal; Craig W. Barber

(57) ABSTRACT

The present invention teaches that a tightly woven, and strong panel of fiberglass may be impregnated with sodium silicate in order to produce a strong and fire resistant panel. The impregnation may occur by spraying, by rolling or by other means, and the drying process of the sodium silicate occurs after it has been impregnated into the fiberglass panel. The present invention further teaches that a fire door core may be mass produced from fire resistant panels and the core rated for fire safety by a rating agency, thus allowing door manufacturers to produce doors using that core without individually certifying each model of door. The present invention further teaches a method of manufacture of the a sodium silicate building panel, comprising the steps of producing a tightly woven fiberglass panel, impregnating it with sodium silicate, and allowing it to dry.

6 Claims, 9 Drawing Sheets

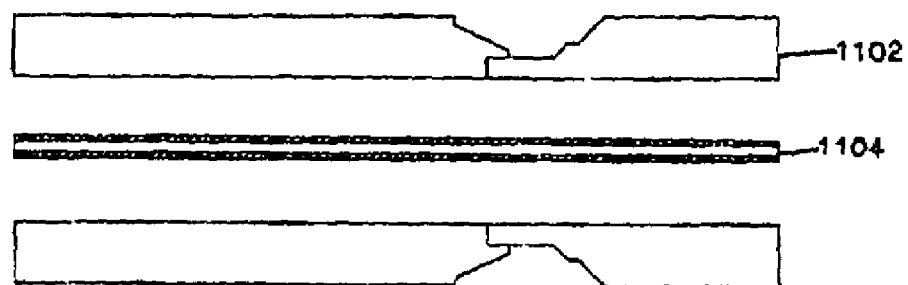
Fig. 11
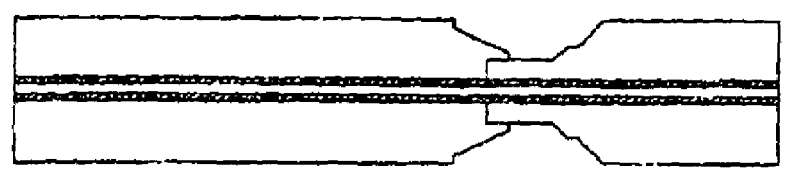
Fig. 12
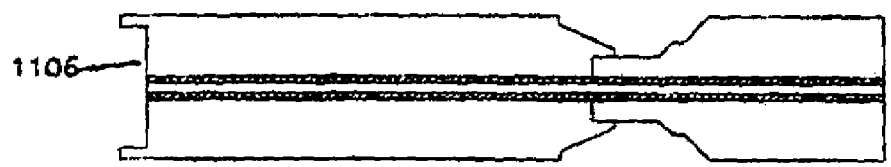
Fig. 13
Fig. 14

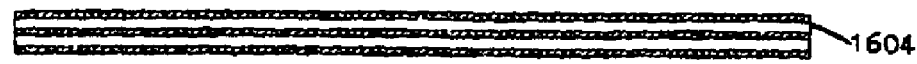
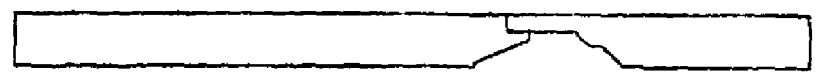
Fig. 16
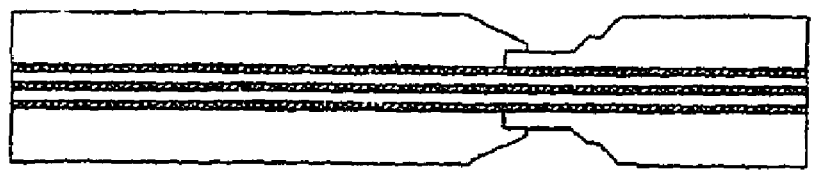
Fig. 17
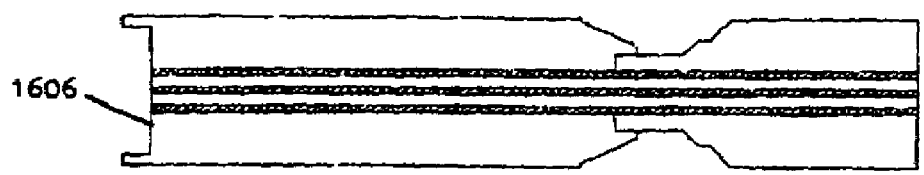
Fig. 18
Fig. 19
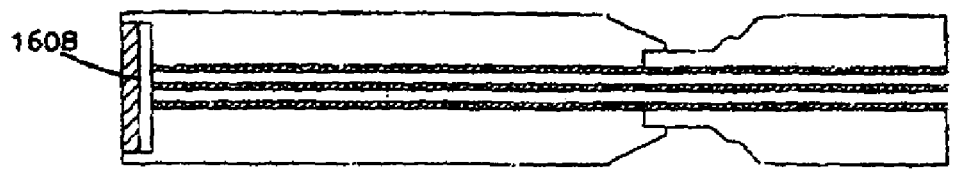

RATED FIRE DOOR CORE AND METHOD OF MAKING

FIELD OF THE INVENTION

This invention relates generally to doors and specifically to fire resistant doors.

CROSS-REFERENCE TO RELATED APPLICATIONS

N/A

STATEMENT REGARDING FEDERALLY FUNDED RESEARCH

This invention was not made under contract with an agency of the US Government, nor by any agency of the US Government.

BACKGROUND OF THE INVENTION

Fire doors for commercial buildings must meet certain local building standards, depending upon nation, state and other level of jurisdiction regulations. In general, fire doors must withstand a given level of heat on one face for a given amount of time. During this time, the door must also block passage of smoke around its periphery, maintain structural strength and so on.

Thus, doors may be rated as "60 minute doors", "20 minute doors", or other types of ratings depending upon the testing organization and local regulations.

However, obtaining this rating is an expensive and time consuming process. A door manufacturer must first construct the door. The interior of the door is normally a laminate or series of layers of various types of structural and fire resistant materials, this interior is called the "core". After the door manufacturer has made the core, they then add panels, runners and other material to the outside facings of the door to provide it with an appearance suitable for commercial use: expensive wood materials, 6 panel arrangements, spots for name plates and so on. Then the manufacturer sends the door to the rating agency for testing. The rating agency will take the door, place it in what amounts to a large oven, and begin exposing one side to flame and extremes of heat. In one testing arrangement, after the door has passed the time rating (for example 60 minutes) without allowing excess heat to reach the "cool" side, it is then required to pass a structural test involving shooting water from a fire hose at the cool side to see if the door collapses under this heavy reverse load.

This testing requirement imposes costs and labor upon door manufacturers. In effect, each model of door must be individually certified to be fire resistant before it can be sold. This imposes a high barrier to entry into the market, since there is no provision for a door manufacturer to buy a "pre-certified" and pre-made core and use it to make an automatically certified door.

Sodium silicate is an extremely useful material for door manufacturers when they are attempting to make doors with the necessary fire resistance. Sodium silicate may be any one or a mixture of several compounds having silica ($Si_2O$) and Sodium oxide ($Na_2O$). Forms of "soluble glass" or "water glass" include sodium disilicate, sodium metasilicate, sodium orthosilicate, sodium tetrasilicate and so on. These may be produced by combining sand and sodium carbonate. Considered a non-hazardous substance (MSDS standards) it does require gloves for handling, as it is extremely destructive of human mucus membranes and may theoretically even cause burns on skin contact.

Importantly, sodium silicates have high melting points and are water soluble. More importantly, when exposed to heat, hydrated sodium silicate absorbs the heat and uses it for a phase transformation. Like water boiling from liquid to gas and maintaining a temperature of 100 degrees C. during the process, sodium silicate changes form, unlike water, the sodium silicate does not boil away or change from a liquid to a gas.

Exposed to heat, several energy absorbing changes occur in hydrated sodium silicate. Firstly, it begins to give up the water molecules trapped within it. The boiling away water molecules carry away a good deal of heat, but crucially the second effect is that the sodium silicate expands (intumesces) from a relatively solid form into a glass foam containing numerous cavities and pockets. This transformation itself absorbs heat and the result is a notably thicker mass of an excellent insulator having a melting point above 800 degrees C. (circa 1500 degrees Fahrenheit). The thickness change is very dramatic: a ratio of six to one expansion is possible.

Thus, door manufacturers frequently use sodium silicate when constructing doors, in particular while the door manufacturer is constructing the core of the door. Care is taken to ensure that the sodium silicate is held in place by materials which will allow its expansion during combustion, this in fact may be regulatory requirement in some jurisdictions.

However, sodium silicate has certain disadvantages. Most notably, exposed to heat it tends to lose structural strength. This means that a layer of sodium silicate within a door may begin to "slump" off of the door as the door burns away. By falling away or slumping away in a mass, the sodium silicate layer surrenders a great deal of its benefit. Door manufacturers must therefore use care in selecting how the sodium silicate layer of the door is supported by the adjacent layers.

However, common sense dictates that the sodium silicate be used as compactly as possible, with as low a mass of additional matter, so that door manufacturer is able to produce a light and not overly thick door.

The form of sodium silicate panel well known for use in fire door construction is available from only one major source, the European company BASF, which has an ancillary operation producing sodium silicate in the form of PALUSOL brand fire board. (Trademark of BASF, not associated with present applicants.) PALUSOL brand panel is a mixture of solid sodium silicate with a low percentage of dissociated strands of fiberglass fabric mixed in, sold in sheets large enough to individually span the width and height of a typical door. While the fiberglass strands provide some limited degree. of strength, BASF specification sheets for PALUSOL brand panel state that there is a risk of breakage is a single panel is transported by itself, and that it must be stored laid flat, and even that the peripheral 5 mm border of the sheet must be trimmed prior to actual use by a door manufacturer in construction of a door. Sodium silicate is normally translucent, the PALUSOL building product panels are white. This building product is produced by mixing into a large flat container of sodium silicate the loose fibers of fiberglass or organic fabric, then drying the hydrated sodium silicate until it assumes a solid cellular form with a degree of water still therein.

One PALUSOL brand fire panel produced by BASF includes a wire mesh at 25 millimeter intervals (almost exactly one inch squares between wires). This is necessary for the door manufacturers as an extended area of PALUSOL will simply slump under heat or even buckle while the door manufacturer is attempting to work with it.

A PALUSOL brand panel must be finished by coating of both sides with epoxy. The PALUSOL water content will otherwise evaporate over time, a tendency so marked that PALUSOL brand panel must even be coated at the edges with epoxy. Door manufacturers making cores are directed by the maker of the PALUSOL brand panels to re-epoxy any edges which are cut down during the course of manufacture. And despite all efforts and expense, panels of PALUSOL brand panel still degrade over time.

It would be preferable to provide a door core not requiring individual certification of each model of door by door manufacturers.

It would further be preferable to provide a product having better thermal protection than panels of sodium silicate with loose fiberglass therein.

It would further be preferable to provide sodium silicate panels having greater structural strength.

It would further be preferable to provide panels having a sodium silicate content which does not require as much effort in preservation and which lasts longer in practice.

SUMMARY OF THE INVENTION

General Summary

The present invention teaches that a tightly woven, and strong panel of fiberglass may be impregnated with sodium silicate in order to produce a strong and fire resistant panel. The impregnation may occur by spraying, by rolling or by other means, and the drying process of the sodium silicate occurs after it has been impregnated into the fiberglass panel.

The present invention further teaches that a fire door core may be mass produced from fire resistant panels and the core rated for fire safety by a rating agency, thus allowing door manufacturers to produce doors using that core without individually certifying each model of door.

The present invention further teaches a method of manufacture of the a sodium silicate building panel, comprising the steps of producing a tightly woven fiberglass panel, impregnating it with sodium silicate, and allowing it to dry.

Summary in Reference to Claims

It is therefore yet another aspect, advantage, objective and embodiment of the present invention to provide a fire resistant panel comprising: a tightly woven fiberglass panel impregnated with sodium silicate.

It is therefore yet another aspect, advantage, objective and embodiment of the present invention to provide a fire resistant panel wherein the fiberglass panel is of a weave sufficiently tight that it prevents passage of light through the panel.

It is therefore yet another aspect, advantage, objective and embodiment of the present invention to provide a fire resistant panel wherein the fiberglass panel has a minimum density of 6 pounds per cubic foot.

It is therefore yet another aspect, advantage, objective and embodiment of the present invention to provide a fire resistant panel wherein the impregnation with sodium silicate further comprises at least 0.06 gallons of approximately 40% percent hydrated sodium silicate per square foot of tightly woven fiberglass panel, approximately 1 cup per square foot.

It is therefore yet another aspect, advantage, objective and embodiment of the present invention to provide a fire resistant panel wherein the impregnation with sodium silicate further comprises at least 0.125 gallons of approximately 40% percent hydrated sodium silicate per square foot of tightly woven fiberglass panel.

It is therefore yet another aspect, advantage, objective and embodiment of the present invention to provide a fire resistant panel further comprising: at least one coating of sodium silicate on at least one surface of the fiberglass panel.

It is therefore yet another aspect, advantage, objective and embodiment of the present invention to provide a door core comprising: at least a first structural layer, at least a second layer of tightly woven fiberglass panel impregnated with sodium silicate bonded to one surface of the first layer; and at least a third structural layer bonded to the second layer of tightly woven fiberglass panel impregnated with sodium silicate.

It is therefore yet another aspect, advantage, objective and embodiment of the present invention to provide a door core wherein the tightly woven fiberglass panel is impregnated with at least 0.125 gallons of approximately 40% percent hydrated sodium silicate per square foot.

It is therefore yet another aspect, advantage, objective and embodiment of the present invention to provide a door core further comprising at least one coating of sodium silicate on at least one surface of the tightly woven fiberglass panel.

It is therefore yet another aspect, advantage, objective and embodiment of the present invention to provide a door core wherein the tightly woven fiberglass panel has a minimum density of 11 pounds per cubic foot of volume.

It is therefore yet another aspect, advantage, objective and embodiment of the present invention to provide a door core further comprising at least a fourth layer of tightly woven fiberglass panel impregnated with sodium silicate bonded to the third layer of hardboard; and at least a fifth structural layer respectively bonded to the fourth layer of tightly woven fiberglass panel impregnated with sodium silicate.

It is therefore yet another advantage, aspect, objective and embodiment of the present invention to provide a door core wherein at least one structural layer comprises one member selected from the group consisting of: hardboard, fiberglass cloth, carbon fiber, carbon fiber fabric, metal sheet, metal mesh, composite mesh, plastic panel, and combinations thereof.

It is therefore yet another aspect, advantage, objective and embodiment of the present invention to provide a door core wherein the door core is tested by a fire door rating agency.

It is therefore yet another aspect, advantage, objective and embodiment of the present invention to provide a method of making a fire resistant panel comprising the steps of: i) providing a tightly woven fiberglass panel; ii) impregnating the tightly woven fiberglass panel with hydrated sodium silicate; and iii) drying the tightly woven fiberglass panel.

It is therefore yet another aspect, advantage, objective and embodiment of the present invention to provide a method of making a fire resistant panel further comprising: iv) heating the tightly woven fiberglass panel during drying.

It is therefore yet another aspect, advantage, objective and embodiment of the present invention to provide a method of making a fire resistant panel wherein the step ii) of impregnating the tightly woven fiberglass panel with hydrated sodium silicate further comprises one member selected from the group consisting of: rolling the hydrated sodium silicate onto the tightly woven fiberglass panel, spraying the hydrated sodium silicate onto the tightly woven fiberglass panel, soaking the hydrated sodium silicate onto the tightly woven fiberglass panel, soaking the hydrated sodium silicate onto the tightly woven fiberglass panel, curtain coating the hydrated sodium silicate onto the tightly woven fiberglass panel, and combinations thereof.

It is therefore yet another aspect, advantage, objective and embodiment of the present invention to provide a method of making a fire resistant panel wherein the step ii) of impregnating the tightly woven fiberglass panel with hydrated sodium silicate further comprises impregnating a minimum of 0.06 gallons of approximately 40% hydrated sodium silicate per square foot.

It is therefore yet another aspect, advantage, objective and embodiment of the present invention to provide a method of making a fire resistant door core comprising the steps of: I) providing a first tightly woven fiberglass panel; ii) impregnating the first tightly woven fiberglass panel with hydrated sodium silicate; iii) drying the first tightly woven fiberglass panel; iv) heating the first tightly woven fiberglass panel during drying; v) bonding with sodium silicate on both surfaces the first dried impregnated tightly woven fiberglass panel to two panels of hardboard; and vi) pressing the panels of hardboard and the dried impregnated tightly woven fiberglass panel therebetween.

It is therefore yet another aspect, advantage, objective and embodiment of the present invention to provide a method of method of making a fire resistant door core further comprising: vii) testing the fire resistant door core using the services of a fire door testing agency.

It is therefore yet another aspect, advantage, objective and embodiment of the present invention to provide a method of making a fire resistant door core further comprising: v-1) repeating steps i) through iv) for a second tightly woven fiberglass panel; v-2) bonding with sodium silicate on one surface the second dried impregnated tightly woven fiberglass panel to one of the two hardboard panels; v-3) bonding with sodium silicate on one surface the second dried impregnated tightly woven fiberglass panel to a third hardboard panel.

BRIEF DESCRIPTION OF THE DRAWINGS

FIG. 11 is a cross-sectional view of a first step of construction.

FIG. 12 is a cross-sectional view of a second step of construction.

FIG. 13 is a cross-sectional view of a third step of construction.

FIG. 14 is a cross-sectional view of fourth step of construction.

FIG. 16 is an exploded cross-sectional view of a 60 minute fire door made according to the invention, in a first step of construction.

FIG. 17 is a cross-sectional view of a second step of construction.

FIG. 18 is a cross-sectional view of a third step of construction.

FIG. 19 is a cross-sectional view of a fourth step of construction.

DETAILED DESCRIPTION

Figure 1:
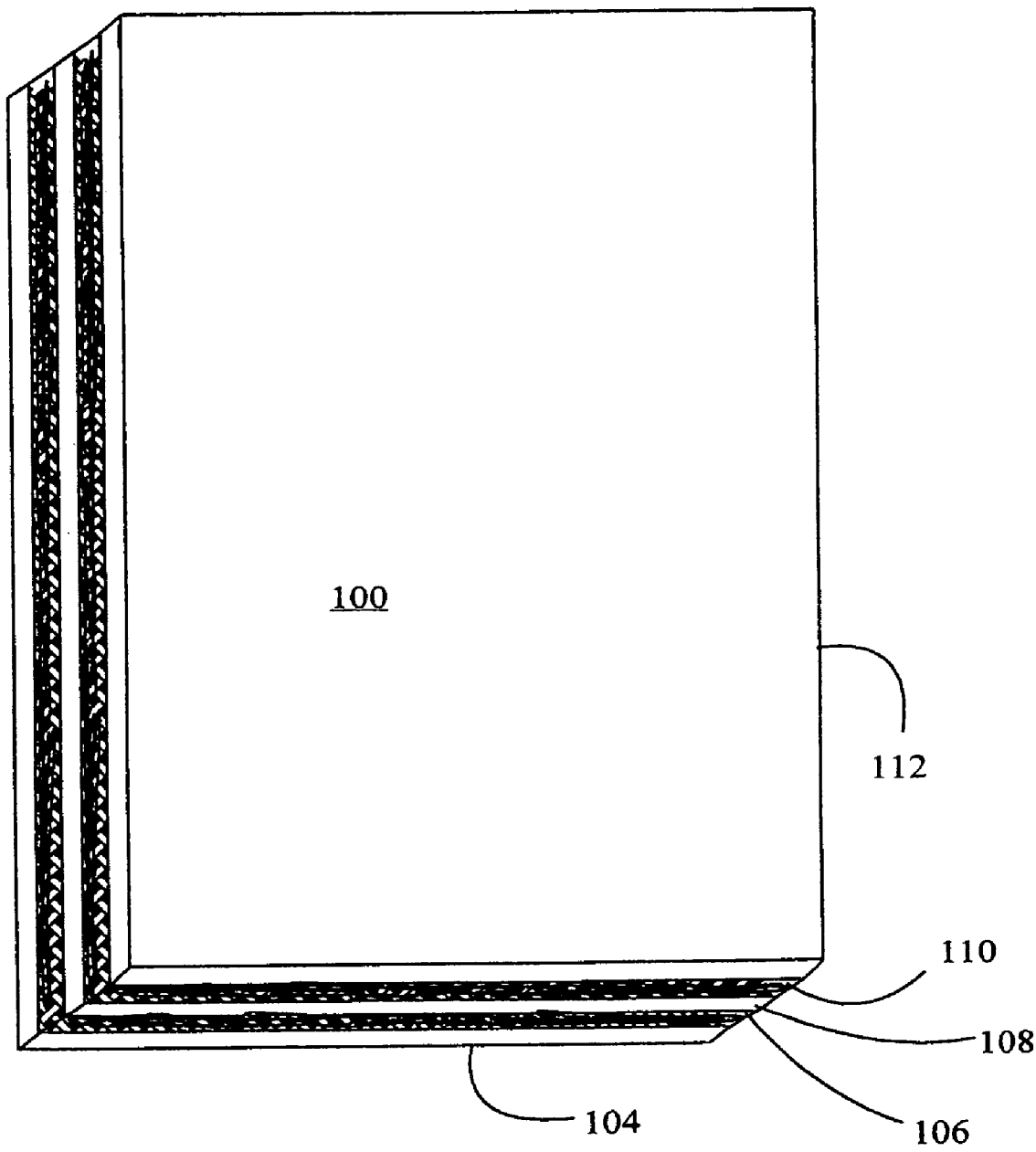
FIG. 1 is a perspective view with vertical scale exaggeration of a door core according to the present invention.

In the presently preferred embodiment and best mode presently contemplated for carrying out the invention, a door core is constructed of three panels of compressed particle board ("hardboard") and two fire resistant panels of the present invention. FIG. 1 is a perspective view with vertical scale exaggeration of a door core 100 according to the present invention. Hardboard panels ("structural layers") 104, 108 and 112 sandwich between them two fire resistant panels 106 and 110.

Figure 15A:
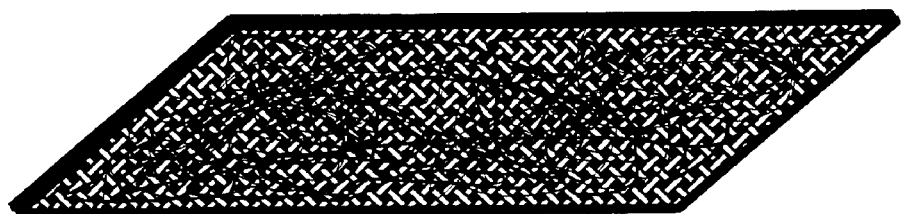
FIGS. 15a, b, c depict the stages in making of a door core according to the present invention.
Figure 15B:
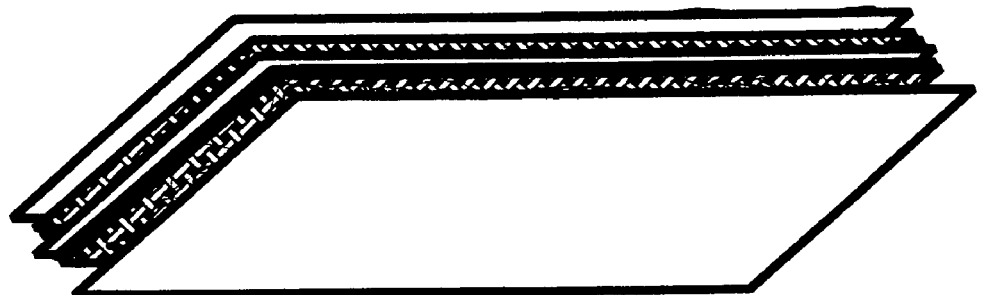

This assembly may bonded together using sodium silicate itself, thus providing additional sodium silicate in the construction beyond that present in the fire resistant panels 106, 110. Other adhesives may be used to assemble door core 100. In addition, the layers are pressed together immediately after being bonded, in a press large enough to press the entire assembly at once. Multiple cores may be pressed at one time. FIGS. 15a, b, c show this assembly. Fire resistant panel 1502 is assembled with another fire resistant panel and three hardboard panels into stack 1504. Note that since sodium silicate is an effective glue, the stack by itself has some structural strength. However, for additional cohesion, press 1506 is used to press stack 1504.

Figure 15C:

Note that while a single stack is depicted in FIG. 15c, thus pressing a single door core, it is usually more practical to press several stacks at the same time, so that one pressing operation may produce several doors. Since the exterior sides of the hardboard panels have no sodium silicate on them, there is little adhesion between stacks, unlike within stacks.

After assembly, example cores in doors may be sent to a fire door testing and certification agency for that testing and certification. The core is sent for certification in a door of the thinnest possible wood: thereafter, any door having thicker wood is acceptable at the same rating without suffering certification. When a door manufacturer buys a core, it has already been certified, thus greatly easing the burden on the door manufacturer. In contrast, makers building their own door cores out of PALUSOL will not only have the burden and expense of building the cores but must overcome the fire door rating agency's testing for each new model of door.

In embodiments of the present invention the door core may have at least one structural layer selected from the group consisting of: hardboard, fiberglass cloth, carbon fiber, carbon fiber fabric, metal sheet, metal mesh, composite mesh, plastic panel, and combinations thereof. Thus, hardboard is not the only possible material for the structural layers of the invention.

Figure 2:
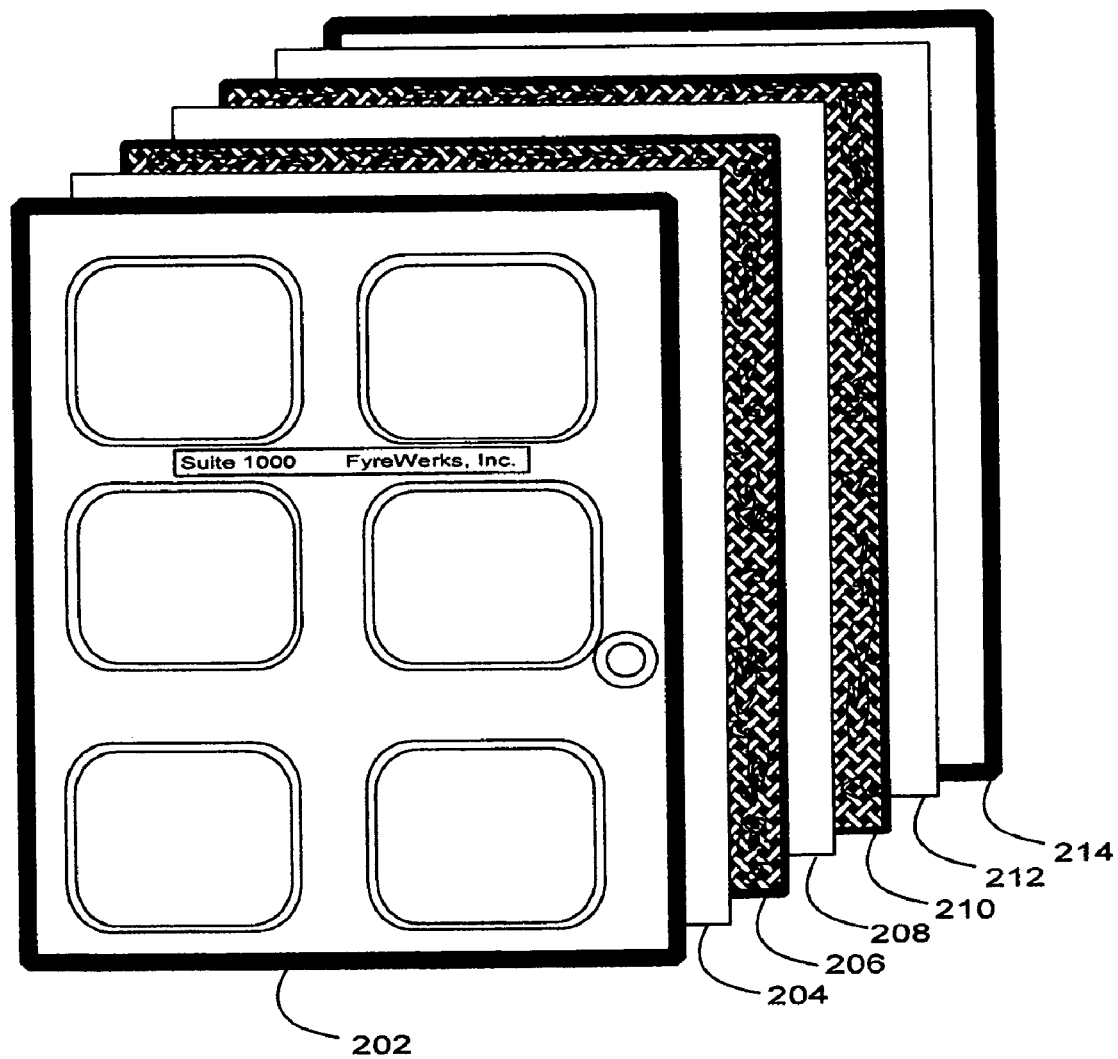
FIG. 2 is an exploded view of a door made with the present invention.
Figure 3:
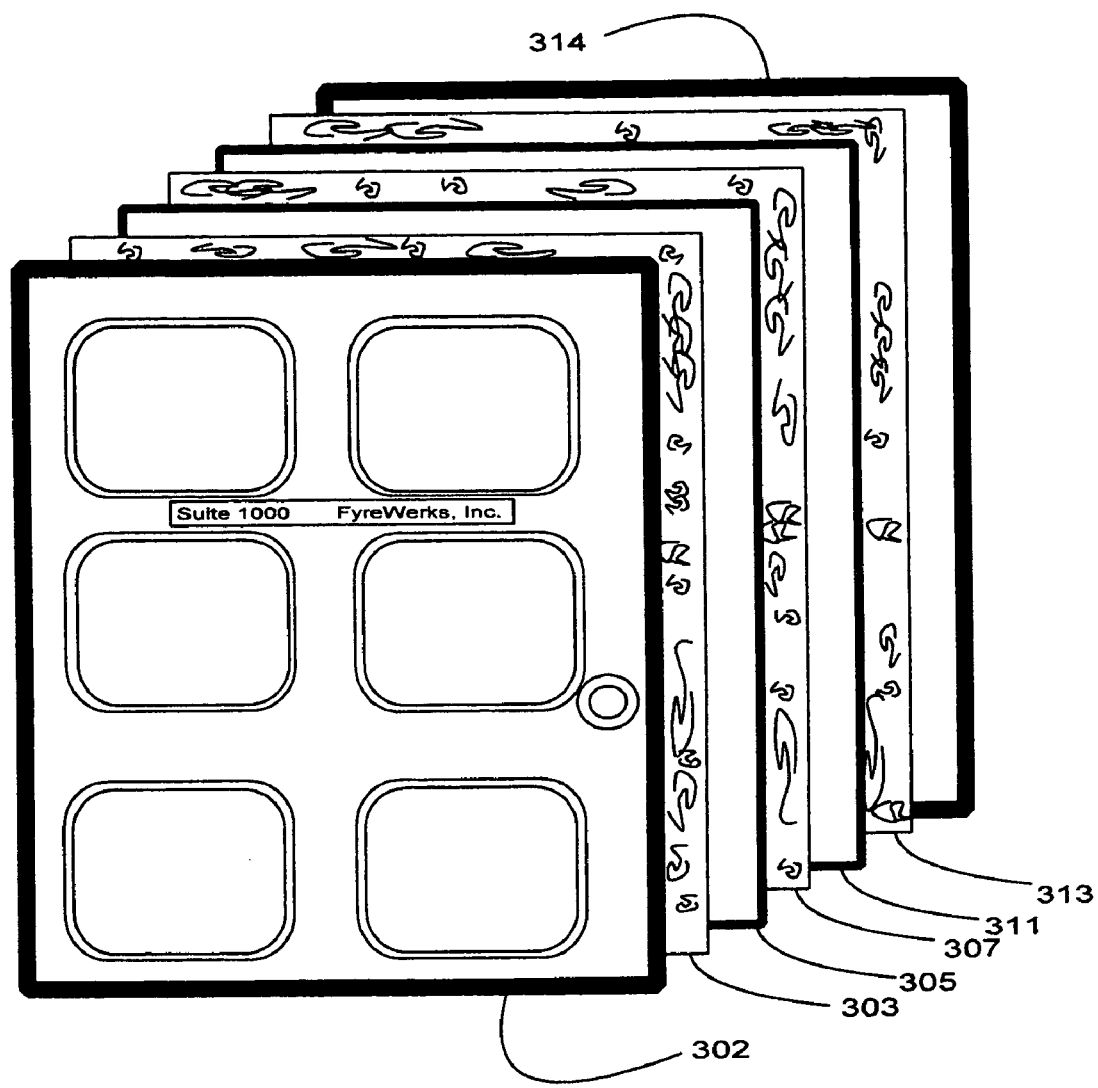
FIG. 3 is a PRIOR ART door made with PALUSOL.

FIG. 2 is an exploded view of a door made with the present invention, in which both the door and the door core of the invention are exploded. Note that the door manufacturer will not deal with the parts of the door core, as that is pre-made and pre-rated before sale. Door face 202 adheres to the core on one side, while opposite door face 214 adheres on the other. The manufacturer may use adhesives or fasteners or a combination of both for this process. The layers of fire resistant material 206, 210 are shown sandwiched between layers of hardboard 204, 208, and 212. By contrast, FIG. 3 is a PRIOR ART door made with PALUSOL. The door maker must in fact build up the door as shown in the exploded view, using individual layers of PALUSOL 303, 307 and 311 supported by hardboard layers 305, 309 and also by door facings 302 and 313. Other combinations of panels and arrangements may be used.

Structurally, the pre-made core of the invention is much stronger than the built core of prior art. First, the invention core 100 has exterior surfaces of hardboard, not PALUSOL, and thus has a stronger surface for attachment to the door facings. This also means that the core of the invention takes and holds fasteners such as screws better than a built up core would. Second, it has three hardboard panels, not two, providing additional strength. Thirdly, the fire resistant panels of the invention are strong panels comprising a tightly woven fiberglass impregnated with sodium silicate rather than the sodium silicate matrix of PALUSOL, which has a much looser and lighter use of loose individual fibers of fiberglass fabric.

Conventional wisdom would suggest that the door core painfully built up out of PALUSOL panels would have superior fire resistance properties to the pre-made door core of the invention, since the prior art core has three layers of much more pure hydrated sodium silicate while the invention door core has only two layers which are based on fiberglass panels impregnated with sodium silicate. However, testing has confirmed the unexpected fact that the pre-manufactured door core of the invention displays fire resistance comparable to prior art door cores (built by the door makers, not by the maker of PALUSOL) out of PALUSOL. Without wishing to be bound by any particular theory, it is believed that this is due to the superior structural strength of the invention. In particular, the loose and disorganized fibers in PALUSOL are intended only to provide sufficient strength for minimal handling until the panels of PALUSOL may be safely sandwiched between other panels of the built up prior art door. They may not always provide sufficient structural strength to hold the hydrated sodium silicate in place during testing or even actual emergencies, when the PALUSOL panel may slump away from the door before being entirely heated or consumed. This is because as the panel of PALUSOL intumesces by up to six times its own size and suffers the loss of the structural supports on either side, it may reach a point of loss of support. The invention on the other hand uses fire resistant panels for the which the initial structure is a tightly woven fiberglass panel having a reasonable degree of structural strength and a fair degree of its own heat resistance. Under heat, the fire resistant panel of the invention will sacrifice the entire hardboard panel on one side without slumping away from the hardboard panel behind it, which it continues to protect. Thereafter, the fire resistant panel of the invention has sufficient structural strength to avoid slumping, thus ensuring that it then sacrifices itself with a high degree of efficiency until it too is entirely heated or consumed. Thus, the structural strength of the invention (an ability to hold together under heat) allows each layer of the door core to sacrifice itself at high efficiency without failing early. Of course, fiberglass itself is an insulator, and so the addition of a tightly woven fiberglass panel not present in the prior art adds an additional heat resisting element. The fiberglass panel may be of a variety of thicknesses ranging from 1/16 of an inch (roughly 1.5 mm) up to substantially thicker measurements such as 3/32 inch, 1/8 inch, 5/32 inch, 3/16 inch, 7/32 inch, 1/4 inch, 9/32 inch, 5/16 inch, 11/32 inch, 3/8 inch, 13/32 inch, 7/16 inch, 15/32 inch, 1/2 inch, intermediate values and/or greater thicknesses.

Figure 4:
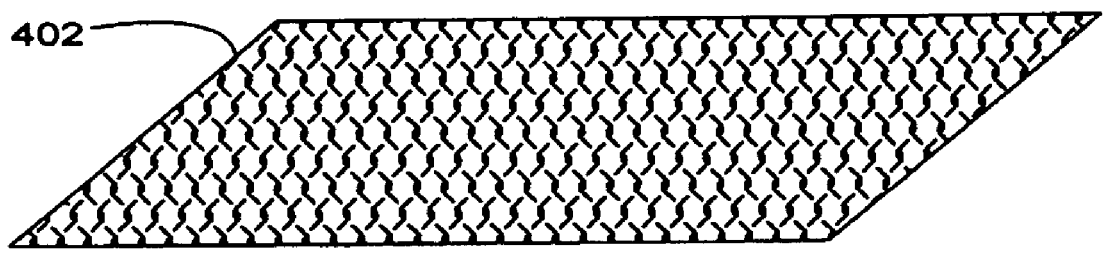
FIGS. 4 through 6 depict the stages in making a fire resistant panel of the present invention.
Figure 5:
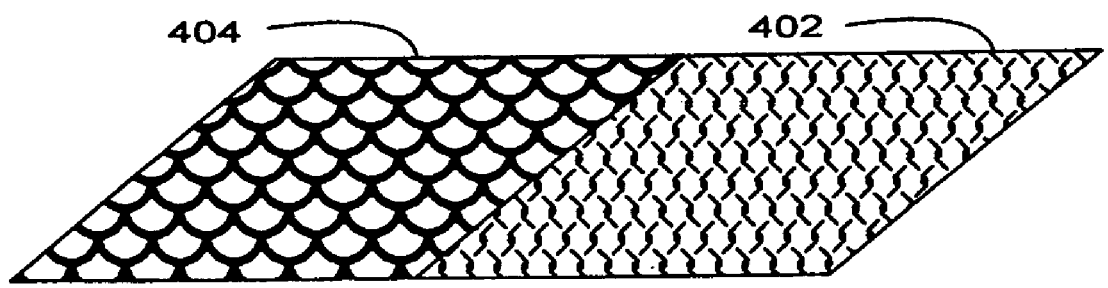
Figure 6:
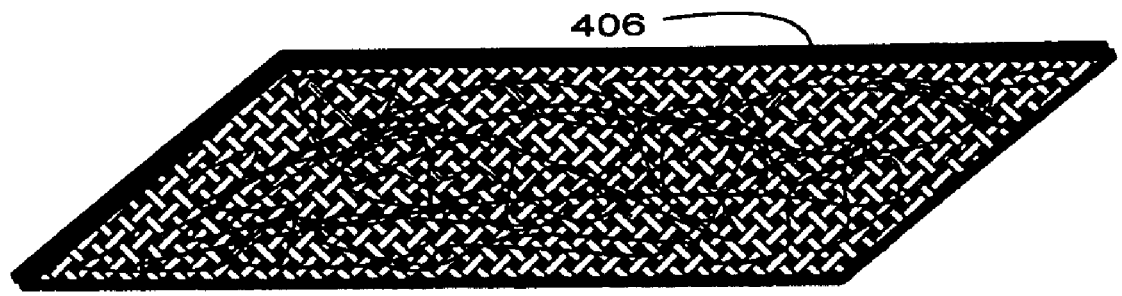

FIGS. 4 through 6 depict the stages in making a fire resistant panel of the present invention. A tightly woven panel of fiberglass 402 is provided. The panel 402 is then coated with hydrated sodium silicate 404, by rolling on, spraying on, submersion or other methods. The term "approximately 40% hydrated" refers to the fact that 40% hydrated sodium silicate as sold may be hydrated in a range from 35% to 45%. Obviously, sodium silicate having other degrees of hydration may be used in the method and construction of the device of the invention. In FIG. 5, a "wet" hydrated sodium silicate surface 404 is shown: due to the viscosity of the sodium silicate the appearance of the panel, when coated, becomes variegated. When the entire panel is coated, it is dried (as shown in FIG. 6), which produces an surface texture and appearance much more regular than during processing and also notably different than the appearance of the non-impregnated panel 402. Thus, dried impregnated tightly woven fiberglass panel 406 is the fire resistant panel 104 of earlier diagrams.

Drying has been tested and may successfully occur under heat lamps, in a special chamber having hygroscopic properties or heat controls, and testing has even revealed that sun drying will produce the desired fire resistant properties.

The amount of hydrated sodium silicate applied to the tightly woven fiberglass panel 402 to produce the fire resistant panel 406 is considered important. In the best mode now contemplated and the presently preferred embodiment, fully 3.75 gallons (approx. 11 liters) of hydrated sodium silicate is applied to a single door size panel of approximately 44 by 97 inches in dimension (roughly 112 cm×246 m). This is roughly 0.125 gallons per square foot. This can be reduced, thus reducing fire resistance of the panel, but at some point the fire resistance of the panel becomes so low that the thickness of the door core made with the panel becomes commercially unacceptable. At the present time, a minimum of 0.06 gallons per square foot is contemplated. Due to the tight weave of the fiberglass panel, there is little or no translucency. While it may be possible to produce a translucent panel by means of the current invention, this would be undesirable since light passing through provides a mechanism for radiation of heat as well, which insulation is supposed to prevent or resist.

In addition to rolling and spraying, soaking the hydrated sodium silicate onto the tightly woven fiberglass panel, curtain coating the hydrated sodium silicate onto the tightly woven fiberglass panel, and combinations thereof may be employed.

Figure 7:
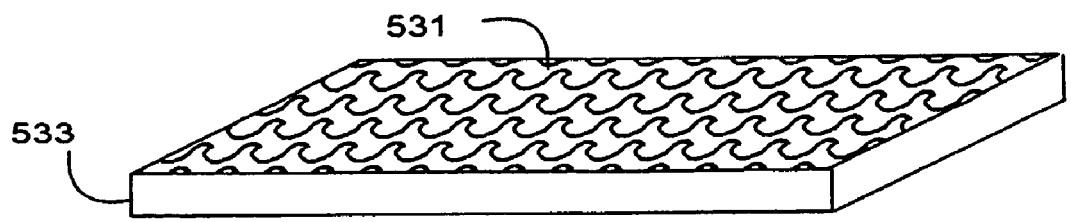
FIGS. 7 through 9 depict the stages in making a PRIOR ART panel of PALUSOL.
Figure 8:
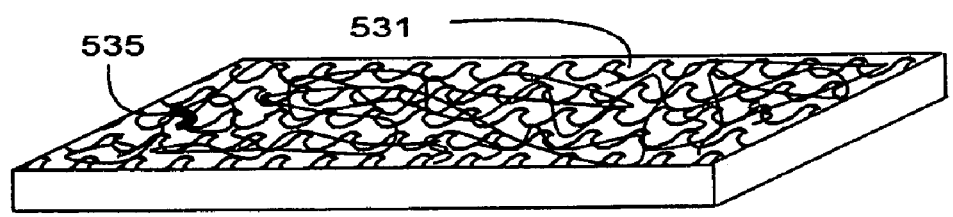
Figure 9:

Strictly for comparison, FIGS. 7 through 9 depict potential stages in making a PRIOR ART panel of PALUSOL. A large quantity of hydrated sodium silicate 531 is poured into a form or tray 533, as shown in FIG. 7. Strands of fiberglass fabric 535 are added and the water content of the sodium silicate reduced until a solid glass panel 503 is produced. Additional rack drying may occur. Visual inspection of a PALUSOL panel 503 reveals the random distribution of the strands of fiberglass fabric throughout it. Since the hydrated sodium silicate and the fiberglass strands are both translucent, the panel is translucent as well.

Figure 10:
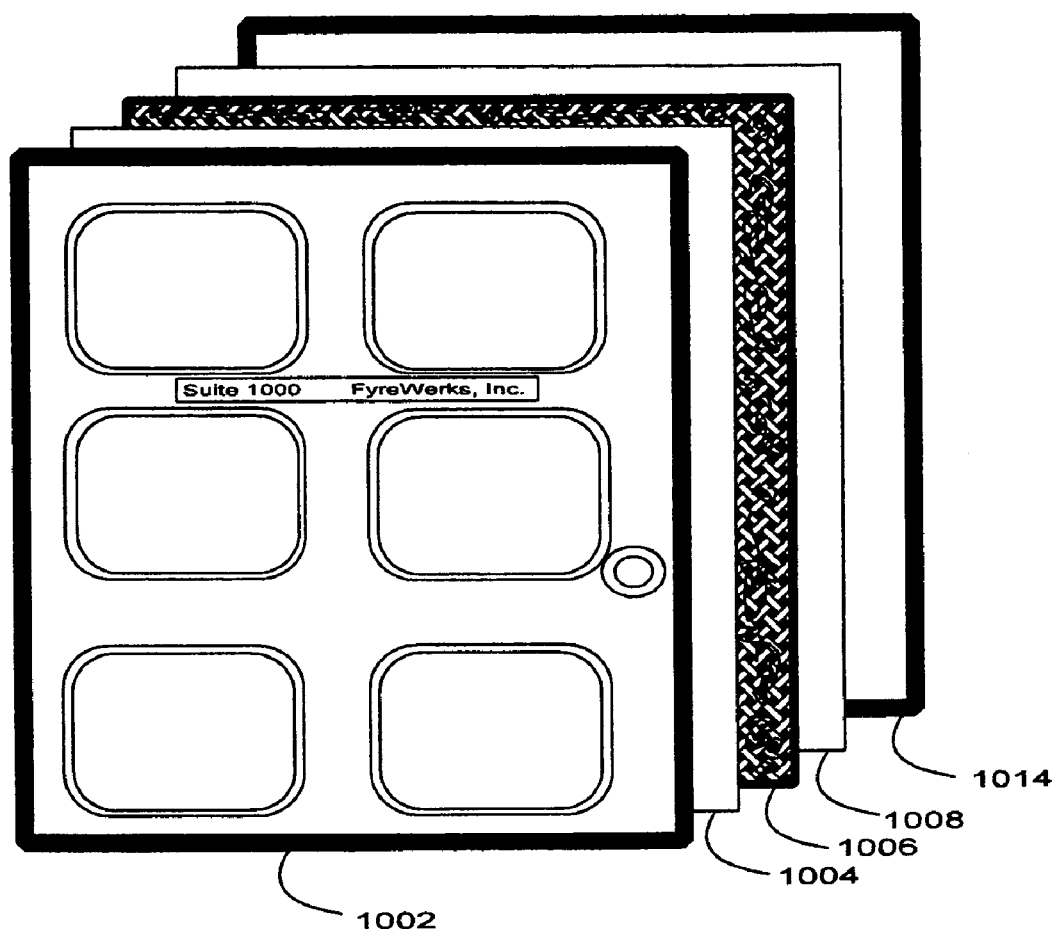
FIG. 10 is an exploded view of a 20 minute door core made according to the invention.

FIG. 10 is an exploded view of a 20 minute door core made according to the invention. This core embodiment is conceptually similar to the door core shown previously, however, it has only one fire resistant layer of dried impregnated tightly woven fiberglass panel, not two, and also has two layers of hardboard, not three. (The hardboard layers add additional fire resistance, as they do take a few minutes to burn.) Layers 604 and 608 are hardboard, layer 606 is a fire resistant panel according to the invention.

Testing by fire door testing, certification and rating agencies provides the door cores of the invention with a rating of 60 minutes for the embodiment of FIG. 1, having 5 layers, and a rating of 20 minutes for the embodiment of FIG. 10, having 3 layers.

FIG. 11 is a cross-sectional view of a first step of construction of a 20 minute door, while FIG. 16 is a cross-sectional view using a 60 minute door core to make a 60 minute rated door: assembling a set of facing/inserts 1102/1602 on either side of a core 1104/1604. As discussed, a door maker may simply fasten hardwood inserts/facing to the panel near the edge/facing over the panel: this step is then completed in FIGS. 12 and 17.

Then the edges of the door assembly may be planed down in a groove 1106/1606 to reveal the inserts, as shown in FIG. 13 and corresponding FIG. 17 for the 60 minute embodiment, both showing a cross-sectional view of a third step of construction.

FIG. 14 is a cross-sectional view of fourth step of construction for the 3 layer embodiment while FIG. 18 shows this for the 5 layer embodiment: a layer of fire resistant material 1108/1608 added facing the edge of the door, that is a narrow strip at a 90 degree angle to the main door surface. This is necessary as sodium silicate based fire resistant panels largely expand perpendicular to the surfaces of the panels. The narrow end strip will expand under heat in the direction of the door jamb, thus sealing the door into the jamb and preventing smoke from jetting around the door. This edge sealing is mandatory under many regulatory schemes. What the door manufacturer does NOT have to do is build up the core out of fire resistant panels and hardboard, and the door manufacturer also does not have to get each new model of door rated, both significant savings in time and effort.

Thus, a door manufacturer may easily buy the pre-rated door of the present invention and use it as a core for a commercial door. Even a 60 minute core is only ½ inch to ⅝ inch (roughly 12.7 to 15.875 mm) thick, while a 20 minute core is only 9/32 of an inch thick (roughly 7 mm). It is faced with hardboard on both, an excellent surface for receiving fasteners (especially compared to PALUSOL, which tends to be fairly weak). It is also an excellent surface to receive adhesives, which is a commercially important improvement over PALUSOL, as PALUSOL brand panels do not accept standard woodworking adhesives.

The invention is enjoying rapid commercial success in the marketplace despite being introduced only weeks prior to this application, as it not only eliminates the necessity for door makers to build a door core and get each new model of door rated, but it also sells for a price easily competitive with the raw materials (PALUSOL and hardboard) of prior art door core constructions, and saves labor costs in assembly for the door manufacturer.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A fire resistant panel, the panel comprising:
a tightly woven fiberglass panel impregnated with at least 0.06 gallons of approximately 40% hydrated sodium silicate per square foot of tightly woven fiberglass panel.

2. The fire resistant panel of claim 1, wherein the fiberglass panel is of a weave sufficiently tight that it prevents passage of light through the panel.

3. The fire resistant panel of claim 1, wherein the fiberglass panel has a minimum thickness of 1/16 inch.

4. Thy fire resistant panel of claim 1, wherein the tightly woven fiberglass panel has a minimum density of 6 pounds per cubic foot.

5. The fire resistant panel of claim 1, wherein the impregnation with sodium silicate further comprises at least 0.125 gallons of approximately 40% hydrated sodium silicate per square foot of tightly woven fiberglass panel.

6. The fire resistant panel of claim 1, further comprising: at least one coating of sodium silicate on at least one surface of the fiberglass panel.

\* \* \* \* \*